(12) United States Patent
Emami et al.

(10) Patent No.: US 11,424,695 B2
(45) Date of Patent: *Aug. 23, 2022

(54) PIEZOELECTRIC GENERATOR, METHOD OF ITS OPERATION AND ITS APPLICATION IN PRODUCTION, STORAGE AND TRANSMISSION OF ELECTRIC ENERGY

(71) Applicants: Roozbeh Khodambashi Emami, Atlanta, GA (US); Amirebrahim Darabi, Atlanta, GA (US)

(72) Inventors: Roozbeh Khodambashi Emami, Atlanta, GA (US); Amirebrahim Darabi, Atlanta, GA (US)

( * ) Notice: Subject to any disclaimer, the term of this patent is extended or adjusted under 35 U.S.C. 154(b) by 52 days.

This patent is subject to a terminal disclaimer.

(21) Appl. No.: 16/677,314

(22) Filed: Nov. 7, 2019

(65) Prior Publication Data
US 2020/0076330 A1 Mar. 5, 2020

Related U.S. Application Data

(63) Continuation of application No. 15/194,006, filed on Jun. 27, 2016, now Pat. No. 10,505,471.

(60) Provisional application No. 62/184,870, filed on Jun. 26, 2015.

(51) Int. Cl.
*H02N 2/18* (2006.01)
(52) U.S. Cl.
CPC ............ *H02N 2/181* (2013.01); *H02N 2/183* (2013.01)
(58) Field of Classification Search
CPC ...................................................... H02N 2/18
See application file for complete search history.

(56) References Cited

U.S. PATENT DOCUMENTS

| | | | |
|---|---|---|---|
| 3,936,678 A | 2/1976 | Mohr | |
| 7,005,779 B2 | 2/2006 | Erickson | |
| 8,311,632 B2 | 11/2012 | Pless et al. | |
| 9,893,655 B2 | 2/2018 | Sakaguchi et al. | |
| 10,505,471 B2 | 12/2019 | Emami et al. | |
| 2006/0087200 A1 | 4/2006 | Sakai | |
| 2007/0278902 A1 | 12/2007 | Rastegar et al. | |
| 2009/0140604 A1* | 6/2009 | Chen | H02N 2/185 310/311 |
| 2010/0019498 A1* | 1/2010 | Pollack | F03B 13/20 290/53 |
| 2013/0020806 A1 | 1/2013 | Hsu | |
| 2013/0033130 A1 | 2/2013 | Nair et al. | |

(Continued)

OTHER PUBLICATIONS

U.S. Appl. No. 62/184,870, filed Jun. 26, 2015, Roozbeh Khodambashi Emami.

(Continued)

*Primary Examiner* — J. San Martin
(74) *Attorney, Agent, or Firm* — Ballard Spahr LLP (57) ABSTRACT

An apparatus comprises a piezoelectric element and a mechanical energy storage unit. The mechanical energy storage unit can be configured to receive a force and store the force as stored mechanical energy. The apparatus further comprises a mass configured to receive the stored mechanical energy from the mechanical energy storage unit when the stored mechanical energy is released, move with a velocity as a result of receiving the stored mechanical energy, and deform the piezoelectric element based on the velocity of the mass.

21 Claims, 9 Drawing Sheets

(56) References Cited

U.S. PATENT DOCUMENTS

| | | | |
|---|---|---|---|
| 2015/0123497 | A1 | 5/2015 | Moss et al. |
| 2015/0145375 | A1 | 5/2015 | Sakaguchi et al. |
| 2016/0072411 | A1 | 3/2016 | Mihara |
| 2016/0380558 | A1 | 12/2016 | Emami et al. |
| 2017/0170751 | A1* | 6/2017 | Chen ................. H02N 2/18 |
| 2017/0207730 | A1 | 7/2017 | Takao et al. |
| 2017/0331397 | A1 | 11/2017 | Kim et al. |

OTHER PUBLICATIONS

U.S. Appl. No. 15/194,006 (2016/0380558-A1) (U.S. Pat. No. 10,505,471), filed Jun. 27, 2016 (Dec. 29, 2016) (Dec. 10, 2019), Roozbeh Khodambashi Emami.

Non Final Rejection dated Jun. 22, 2018 by the USPTO for U.S. Appl. No. 15/194,006, filed Jun. 27, 2016 and granted as 10,505,471 on (Inventor—Roozbeh Khodambashi Emami) (9 Pages).

Response to Non Final Rejection dated Oct. 22, 2018 to the USPTO for U.S. Appl. No. 15/194,006, filed Jun. 27, 2016 and granted as 10,505,471 on (Inventor—Roozbeh Khodambashi Emami) (10 Pages).

Final Rejection dated Jan. 10, 2019 by the USPTO for U.S. Appl. No. 15/194,006, filed Jun. 27, 2016 and granted as 10,505,471 on (Inventor—Roozbeh Khodambashi Emami) (8 Pages).

Response to Final Rejection and Request for Continued Examination dated Jul. 10, 2019 to the USPTO for U.S. Appl. No. 15/194,006, filed Jun. 27, 2016 and granted as 10,505,471 on (Inventor—Roozbeh Khodambashi Emami) (10 Pages).

Notice of Allowance dated Aug. 7, 2019 by the USPTO for U.S. Appl. No. 15/194,006, filed Jun. 27, 2016 and granted as 10,505,471 on (Inventor—Roozbeh Khodambashi Emami) (8 Pages).

Issue Notification dated Nov. 20, 2019 by the USPTO for U.S. Appl. No. 15/194,006, filed Jun. 27, 2016 and granted as 10,505,471 on (Inventor—Roozbeh Khodambashi Emami) (1 Page).

* cited by examiner

PIEZOELECTRIC GENERATOR, METHOD OF ITS OPERATION AND ITS APPLICATION IN PRODUCTION, STORAGE AND TRANSMISSION OF ELECTRIC ENERGY

CROSS REFERENCE TO RELATED PATENT APPLICATION

This application is a continuation of U.S. patent application Ser. No. 15/194,006, filed Jun. 27, 2016, which claims priority to U.S. Provisional Application No. 62/184,870 filed Jun. 26, 2015 both of which are herein incorporated by reference in their entirety.

BACKGROUND

Fossil fuels are a predominant energy source throughout the world. However, the mining and use of fossil fuels as an energy source causes environmental issues as well as being a major contributor to global warming. Alternative, non-fossil fuel energy sources such as renewable energy resources have become an important technological need for the decades to come. Some examples of predominant renewable energy resources include but are not limited to ocean wave energy, hydroelectric, wind energy, biofuels, solar energy, geothermal energy, and the like. Many electricity generators that capture the energy of these renewable energy resources involve turbines coupled to generators that comprise a magnet and coil that operate based on magnetic induction principals. These mechanical systems are large and expensive to produce and maintain.

Piezoelectric materials have been used to generate electricity for small devices such as sensors, personal devices, medical devices, and the like. Piezoelectric materials generate an electrical signal as a result of being put under a mechanical load. Piezoelectric materials are formed into small cantilever beams that can range from a several micrometers to a few millimeters. The vibrations of the cantilever beam cause the piezoelectric material to undergo cyclic tension and compression and thus a voltage is produced across its sides. The produced voltage is in the order of a few millivolts. Applications of devices that incorporate piezoelectric materials include distributed sensor networks in which there is a large number of remote sensors which are difficult to maintain regarding battery replacement. However, electricity generation using piezoelectric materials has been limited to low power generation. These and other shortcomings are addressed in the present disclosure.

SUMMARY

In one aspect, an apparatus can comprise a piezoelectric element and a mechanical energy storage unit. The mechanical energy storage unit can be configured to receive a force and store the force as stored mechanical energy. The apparatus further comprises a mass configured to receive the stored mechanical energy from the mechanical energy storage unit when the stored mechanical energy is released, move with a velocity as a result of receiving the stored mechanical energy, and deform the piezoelectric element based on the velocity of the mass.

In another aspect, an apparatus can comprise a support, a cam configured to use a portion of the support to rotate the cam, and a lever configured to receive a force that rotates the cam. The apparatus can further comprise a piezoelectric generator unit comprising a piezoelectric element, a mechanical energy storage unit configured to receive mechanical energy from the cam as it rotates about the portion of the support and store the mechanical energy as stored mechanical energy, and a mass. The mass can be configured to receive the stored mechanical energy from the mechanical energy storage unit when the stored mechanical energy is released, move with a velocity as a result of receiving the stored mechanical energy, and deform the piezoelectric element based on the velocity of the mass.

In another aspect, an electricity generation module can comprise a flexible housing and a first piezoelectric generator unit. The first piezoelectric generator unit can comprise a piezoelectric element, a mechanical energy storage unit configured to receive mechanical energy from the flexible housing and store the mechanical energy as stored mechanical energy, wherein the flexible housing generates the mechanical energy due to deformation of the flexible housing by a force applied to the flexible housing, and a mass. The mass can be configured to receive the stored mechanical energy from the mechanical energy storage unit when the stored mechanical energy is released, move with a velocity as a result of receiving the stored mechanical energy, and deform the piezoelectric element based on the velocity of the mass.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

The present disclosure describes methods and systems that extract electrical energy from mechanical energy using piezoelectric materials. The systems can be used in extracting electrical energy from fluid motion, human body motion, and the like. For example, electrical energy can be extracted from waves of a body of water such as the ocean, wind, running water, and the like. In an aspect, an apparatus can comprise a piezoelectric element. The piezoelectric element can comprise a piezoelectric material such as certain crystals (e.g., quartz, langasite, gallium orthophosphate, lithium niobate, lithium tantalite, lead titanate, topaz, and the like), ceramics (e.g., perovskite ceramics, barium titanate, lead zirconate titanate (PZT) such as PZT-5H and PZT-5A, sodium tungstate, sodium potassium niobate, bismuth ferrite, bismuth titanate, and the like), group III-V and II-VI semiconductors, and polymers such as polyvinyldiene fluoride (PVDF). The piezoelectric material is a material that can be configured to generate an electrical signal when the piezoelectric material is put under a mechanical stress and/or strain. For example, the piezoelectric material can be configured such that a hammer or other striking element impacts the piezoelectric material. A force generated by the impact from the hammer can cause the material to generate a voltage potential. In some materials, the voltage potential can be relatively large, on the order of thousands of volts. The voltage potential generated can be proportional to the suddenness and/or the strength of a force applied to the piezoelectric material. Therefore, mechanical energy can be converted into electrical energy by applying the mechanical energy to the piezoelectric element. In some aspects, the piezoelectric material can be formed as a disc, a cylinder, or other shapes beneficial to design or function. In some aspects, a size of the piezoelectric material can be maximized to help produce a larger amount of energy (e.g., a larger electrical charge).

The apparatus can optionally comprise a mechanical energy storage unit. The mechanical energy storage unit can be configured to receive a force and store the force as stored mechanical (e.g., potential) energy. For example the mechanical energy storage unit can comprise a spring, such as a helical spring or a flat spring. As another example, the energy storage unit can comprise one or more elastic materials.

The apparatus further comprises a mass. The mass can be attached to the mechanical energy storage unit and disposed near the piezoelectric material, such that the mass can be used as the hammer or other striking material to strike the piezoelectric material, such that at least a portion of the mechanical energy stored in the mechanical energy storage unit can be transferred to the piezoelectric material.

When struck by the mass, the piezoelectric material can generate an electrical charge. The electric charge generated by the piezoelectric element can be stored in an electrical storage device. For example, the electrical storage device can comprise one or more batteries and/or one or more capacitors. In some aspects, a voltage of the electrical charge can be reduced using, for example, a step-down transformer before the charge is stored by the electrical storage device. In some aspects, the electrical charge can be can be rectified using a rectifier to help ensure that the charge is fully direct current (DC) energy.

Figure 1:
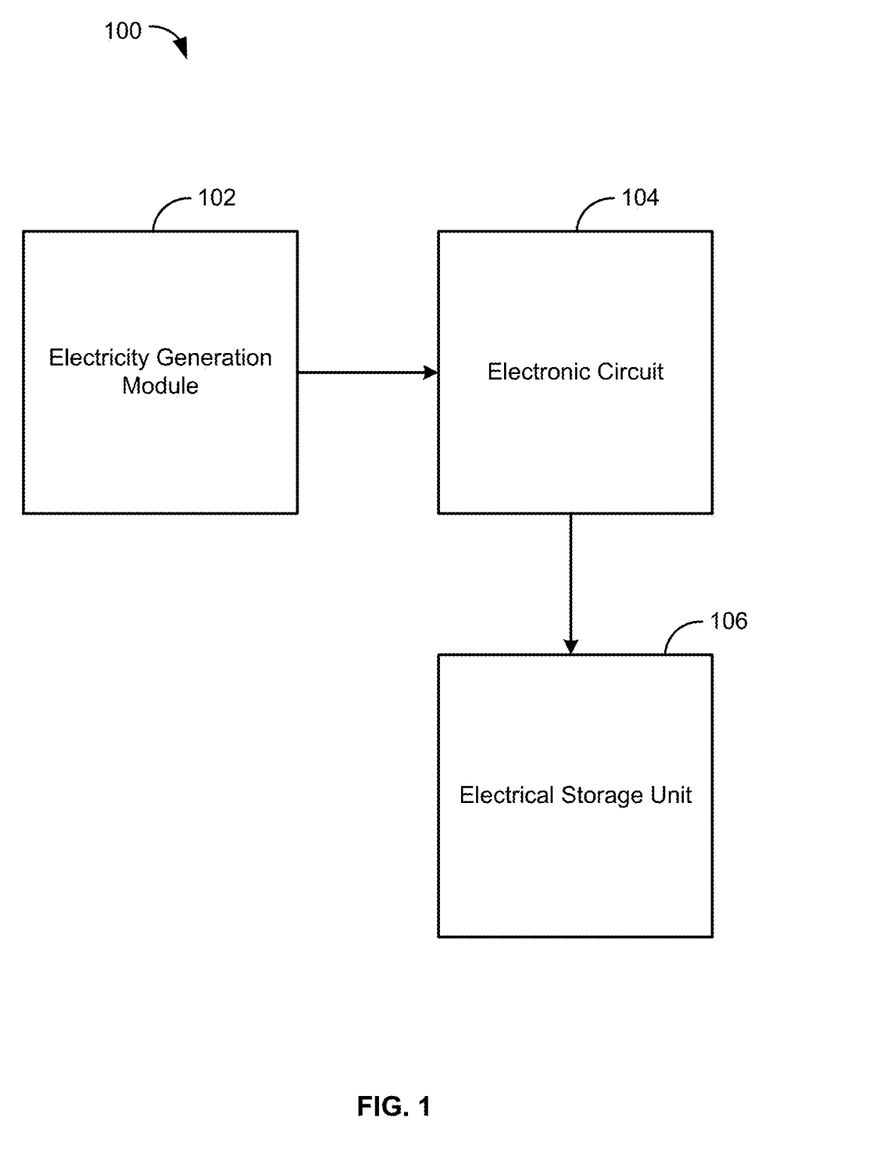
FIG. 1 illustrates a block diagram of an example system.

FIG. 1 shows a block diagram of a piezoelectric power generation system 100. In an aspect, the system 100 comprises an electricity generation module 102, an electronic circuit 104 electrically coupled to the electricity generation module 102, and an electrical storage unit 106 electrically coupled to the electronic circuit 104.

Figure 2:
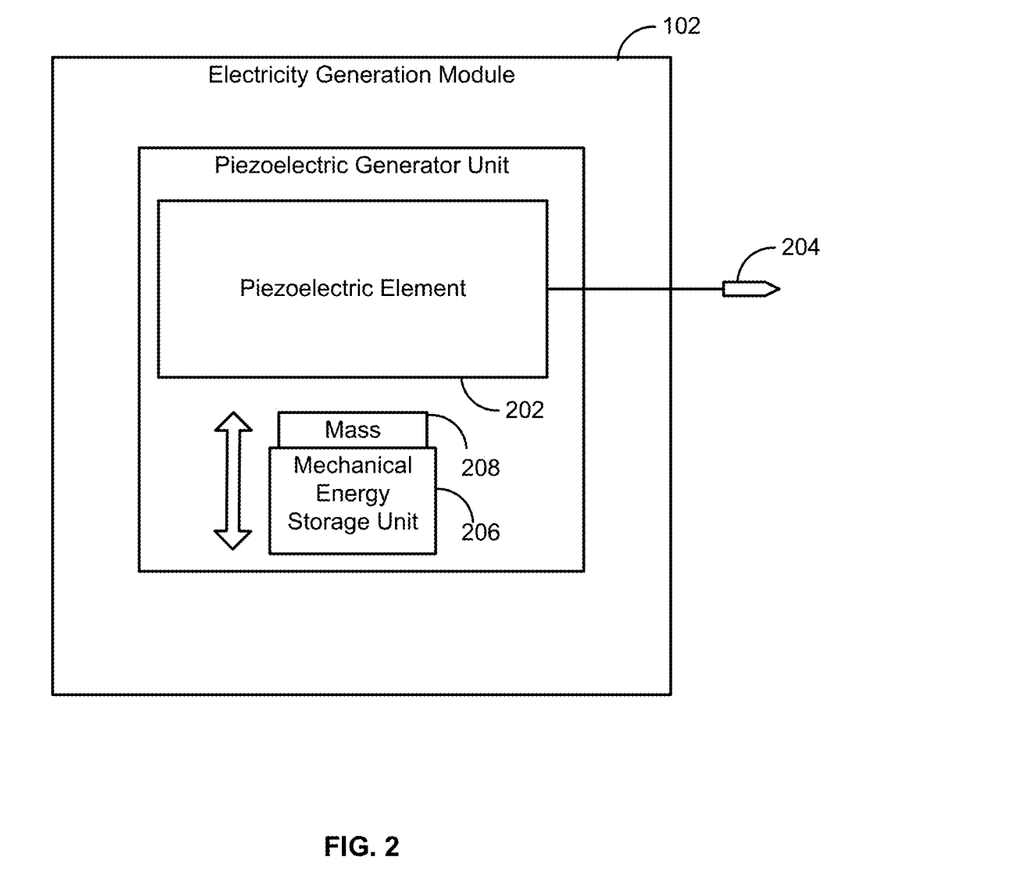
FIG. 2 illustrates a block diagram of an electricity generation module.

FIG. 2 shows a detailed block diagram of the electricity generation module 102. The electricity generation module can be used to generate electricity from, for example, mechanical energy created by movement of at least a portion of the power generation system 100. In some aspects, the energy generation module 102 can comprise at least a piezoelectric element 202 for converting mechanical energy to electrical charge. The piezoelectric element can comprise an output 204. In some aspects, the output 204 can be coupled to an electronic circuit (e.g., the electronic circuit 104).

The electricity generation module 102 can further comprise a mechanical energy storage unit 206 configured to receive a force and store the force as stored mechanical (e.g., potential) energy. For example the mechanical energy storage unit 206 can comprise a spring, such as a helical spring or a flat spring. As another example, the mechanical energy storage unit 206 can comprise one or more elastic materials.

The electricity generation module 102 can further comprise a mass 208. The mass 208 can be affixed to the mechanical energy storage unit 206 and disposed near the piezoelectric material 202, such that the mass 208 can be used as the hammer or striking material to strike the piezoelectric material 202, such that at least a portion of the mechanical energy stored in the mechanical energy storage unit 206 can be transferred to the piezoelectric material 202, thereby generating an electrical charge via the piezoelectric effect.

Figure 3A:
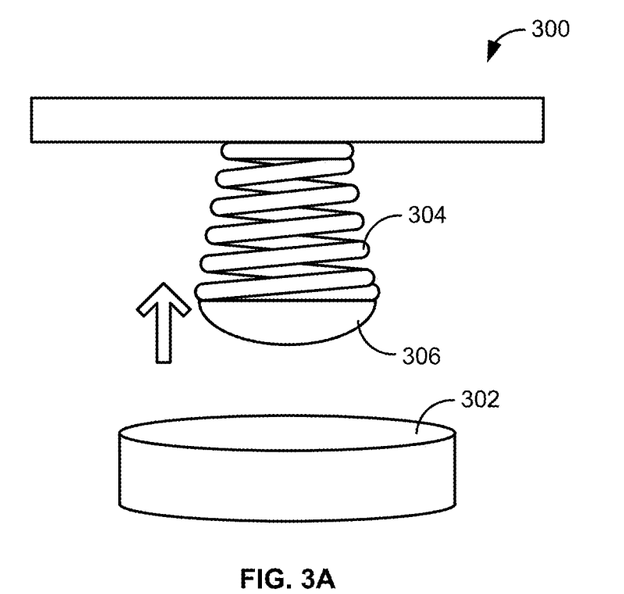
FIGS. 3A and 3B illustrate a perspective view of an example electricity generation module.
Figure 3B:
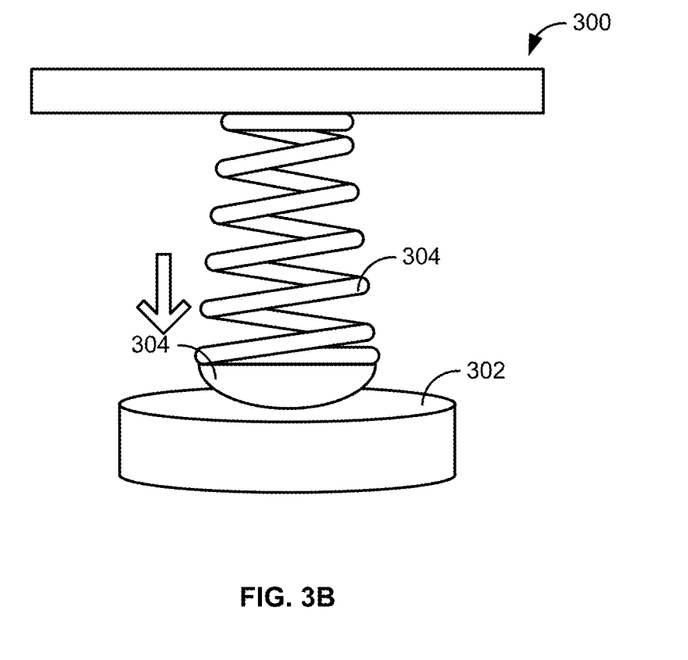

FIGS. 3A and 3B show an embodiment 300 of the electricity generation module 102. The embodiment 300 includes a piezoelectric element 302. The piezoelectric element can be formed from a piezoelectric material such as certain crystals (e.g., quartz, langasite, gallium orthophosphate, lithium niobate, lithium tantalite, lead titanate, topaz, and the like), ceramics (e.g., perovskite ceramics, barium titanate, lead zirconate titanate (PZT), sodium tungstate, sodium potassium niobate, bismuth ferrite, bismuth titanate, and the like), group III-V and II-VI semiconductors, and polymers such as polyvinyldiene fluoride (PVDF). The piezoelectric material can comprise any material that can be configured to generate an electrical signal when the piezoelectric material is put under a mechanical stress and/or strain. For example, a force generated by an impact can cause the material to generate an electrical charge having a voltage potential. In some materials, the generated voltage potential can be relatively large, on the order of thousands of volts. The generated voltage potential can be proportional to the suddenness and/or the strength of the mechanical stress and/or strain applied to the piezoelectric material. Therefore, mechanical energy can be converted into electrical energy by using the mechanical energy to impart a mechanical stress and/or strain to the piezoelectric element. In some aspects, the piezoelectric element can be formed as a disc, a cylinder, or other shapes beneficial to design and/or function.

The embodiment 300 can further comprise a mechanical energy storage unit 304 configured to receive a force (e.g., movement of a power generation system, movement of a medium relative to the power generation system, etc.) and store the received force as stored mechanical (e.g., potential) energy. As shown in FIGS. 3A and 3B, the mechanical energy storage unit 304 can comprise a helical spring. The received force, as indicated by the arrow in FIG. 3A, can cause compression of the helical spring.

The embodiment 300 can further comprise a mass 306. The mass 306 can be attached to the mechanical energy storage unit 304 and disposed near the piezoelectric material 302, such that the mass 306 can be used as the hammer or other striking material to strike the piezoelectric material 302. In some aspects, the mass 306 can be formed from a relatively incompressible material, such as, for example, steel. In addition to being relatively incompressible, the material used to form the mass can have a relatively high impedance. Further, in some aspects the mass can be formed from a material having a relatively high density. In some aspects, it can be advantageous for the mass 306 to comprise a relatively heavy mass, which can result in increased energy generation.

In some aspects, the mass can be formed as a hemisphere, a cone, a pyramid, or any other shape that helps to minimize the contact area between the mass 306 and the piezoelectric element 302. At least a portion of the mechanical energy stored in the mechanical energy storage unit 304 can be transferred to the piezoelectric material 302 by striking the piezoelectric element 302 with the mass 306. For example, as shown in FIG. 3B, the received force can be released by a return of the mechanical energy storage unit 304 to its low-energy state (e.g., an expansion of a compressed spring).

Figure 4A:
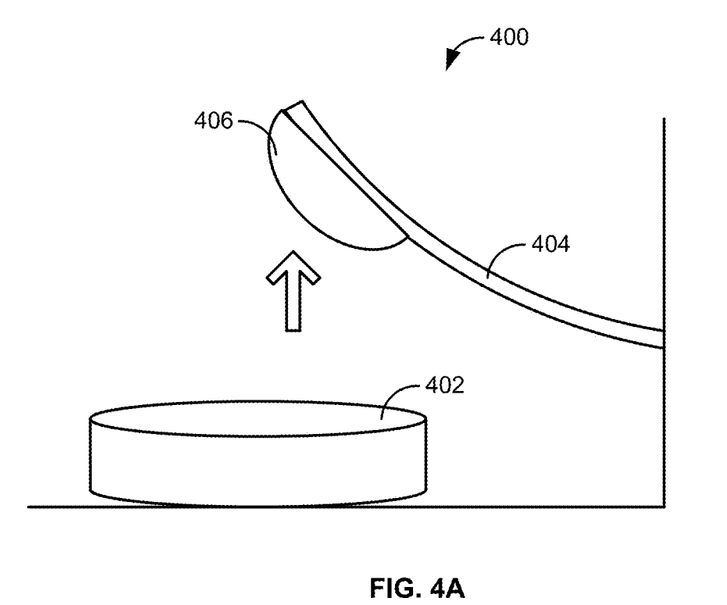
FIGS. 4A and 4B illustrate a perspective view of another example electricity generation module
Figure 4B:
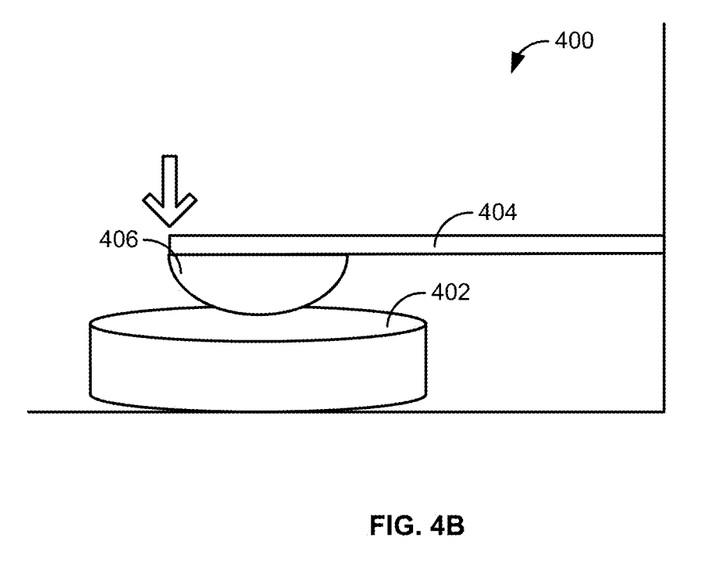

FIGS. 4A and 4B show another embodiment 400 of the electricity generation module 102. The embodiment 400 includes a piezoelectric element 402. The piezoelectric element can be formed from a piezoelectric material such as certain crystals (e.g., quartz, langasite, gallium orthophosphate, lithium niobate, lithium tantalite, lead titanate, topaz, and the like), ceramics (e.g., perovskite ceramics, barium titanate, lead zirconate titanate (PZT), sodium tungstate, sodium potassium niobate, bismuth ferrite, bismuth titanate, and the like), group III-V and II-VI semiconductors, and polymers such as polyvinyldiene fluoride (PVDF). The piezoelectric material can comprise any material that can be configured to generate an electrical signal when the piezoelectric material is put under a mechanical stress and/or strain. For example, a force generated by an impact can cause the material to generate an electrical charge having a voltage potential. In some materials, the generated voltage potential can be relatively large, on the order of thousands of volts. The generated voltage potential can be proportional to the suddenness and/or the strength of the mechanical stress and/or strain applied to the piezoelectric material. Therefore, mechanical energy can be converted into electrical energy by using the mechanical energy to impart a mechanical stress and/or strain to the piezoelectric element. In some aspects, the piezoelectric element can be formed as a disc, a cylinder, or other shapes beneficial to design and/or function.

The embodiment 400 can further comprise a mechanical energy storage unit 404 configured to receive a force (e.g., movement of a power generation system, movement of a medium relative to the power generation system, etc.) and store the received force as stored mechanical (e.g., potential) energy. As shown in FIGS. 4A and 4B, the mechanical energy storage unit 404 can comprise a flat spring. The received force, as indicated by the arrow in FIG. 4A, can cause flexion of the flat spring.

The embodiment 400 can further comprise a mass 406. The mass 406 can be attached to the mechanical energy storage unit 404 and disposed near the piezoelectric material 402, such that the mass 406 can be used as the hammer or other striking material to strike the piezoelectric material 402. In some aspects, the mass 406 can be formed from a relatively incompressible material, such as, for example, steel. In addition to being relatively incompressible, the material used to form the mass can have a relatively high impedance. Further, in some aspects the mass can be formed from a material having a relatively high density. In some aspects, it can be advantageous for the mass 406 to comprise a relatively heavy mass, which can result in increased energy generation. In some aspects, the mass 406 can be formed as a hemisphere, a cone, a pyramid, or any other shape that helps to minimize the contact area between the mass 406 and the piezoelectric element 402. At least a portion of the mechanical energy stored in the mechanical energy storage unit 404 can be transferred to the piezoelectric material 402 by striking the piezoelectric element 402 with the mass 406. For example, as shown in FIG. 4B, the received force can be released by a return of the mechanical energy storage unit 304 to its low-energy state (e.g., an expansion of a compressed spring).

Figure 5:
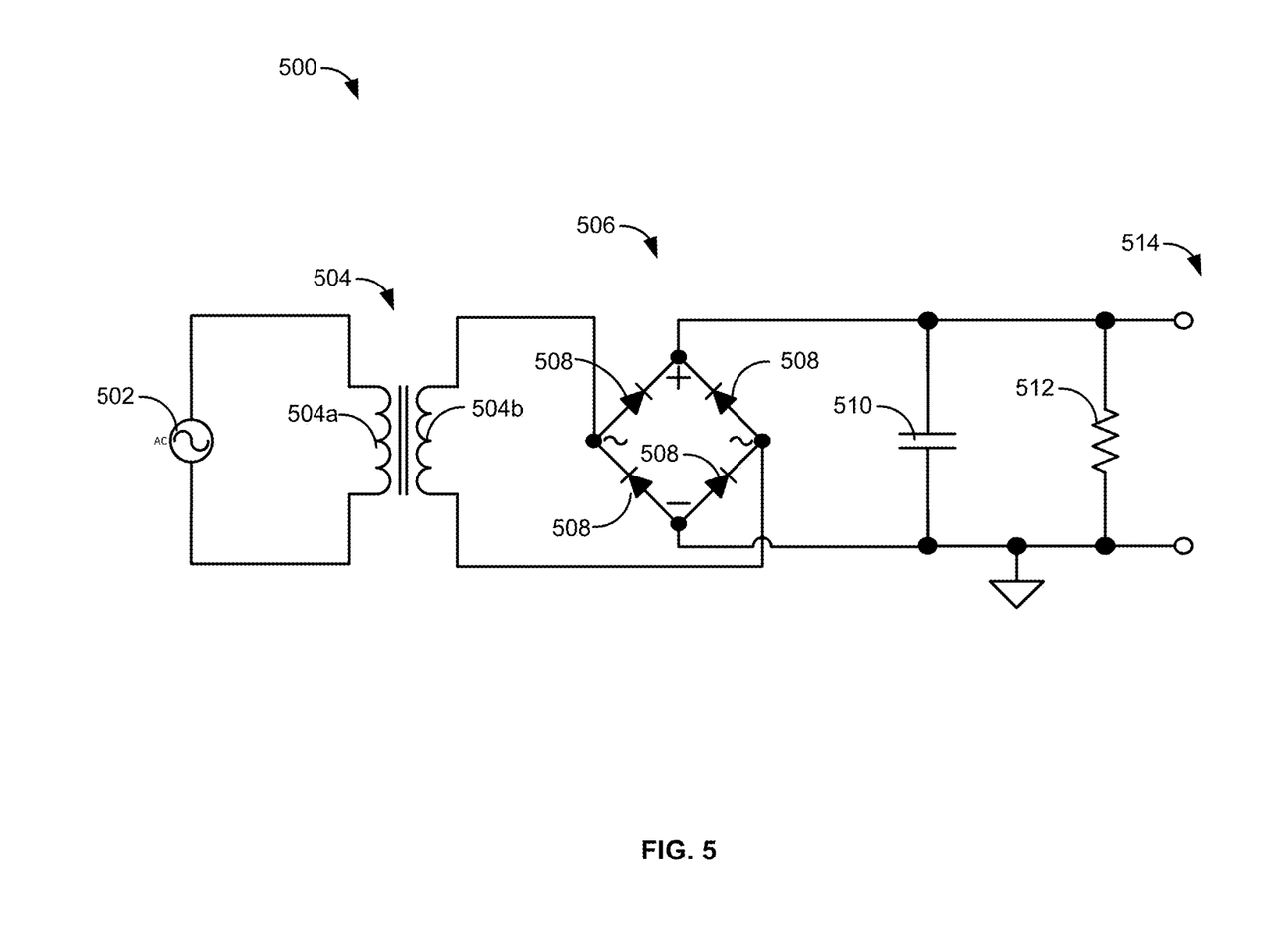
FIG. 5 illustrates an electronic circuit of an example system.

FIG. 5 shows an embodiment 500 of an electronic circuit (e.g., the electronic circuit 104) that is used with the piezoelectric power generation system. In some aspects, the circuit 500 can comprise (e.g., be electrically coupled to) an alternating current energy source 502. In some aspects, the energy source 502 can comprise the electricity generation module 102.

The circuit 500 can further comprise a transformer 504. In some aspects, the transformer 504 can comprise a primary winding 504a and a secondary winding 504b. The primary winding 504a can be greater than the secondary winding 504b. For example, the ratio between the primary winding 504a and the secondary winding 504b can be between about 200:1 and about 800:1. As specific examples, the ratio between the primary winding 504a and the secondary winding 504b can be 300:1, 400:1, 500:1. 650:1, etc. In some aspects, the transformer 504 can be used to convert a relatively high-voltage, relatively low-current power provided from the energy source 502 into relatively lower-voltage, relatively higher-current power.

The circuit 500 can further comprise a rectifier 506, electrically coupled to the output of the transformer 504. The rectifier 506 can be used to convert the alternating current energy to direct current. In some aspects, the rectifier 506 can comprise a full-wave rectifier. The full-wave rectifier can convert the whole of the input waveform (e.g., from the transformer 504) to one of constant polarity at its output. Full-wave rectification converts both polarities of the input waveform to pulsating DC (direct current). As shown in FIG. 5, the rectifier 506 can comprise four diodes 508 arranged in a bridge configuration and electrically coupled to an AC source (e.g., the transformer 504).

The rectifier 506 can further comprise elements used to smooth the output of the rectifier, thereby producing a relatively steady direct current output. As shown in FIG. 5, the elements used to smooth the output can comprise, for example, a capacitor 510 and a resistor 512. Sizing of the capacitor 510 represents a tradeoff. For example, a larger capacitor can provide a relatively small variation in the direct current (e.g., ripple) but costs more and creates higher peak currents in the transformer 504. To limit ripple to a specified value, the capacitor size can be proportional to a load current and inversely proportional to a supply frequency and a number of output peaks of the rectifier 506 per input cycle.

To further reduce ripple, a capacitor-input filter (not shown) can be used. The capacitor filter complements the reservoir capacitor with a choke (inductor) and a second filter capacitor, so that a steadier DC output can be obtained across the terminals of the filter capacitor. An alternative to the filter can be to follow the reservoir capacitor with an active voltage regulator circuit (not shown). The capacitor 510 can be sized to prevent troughs of the ripple from dropping below a predefined minimum voltage required by the regulator circuit to produce the required output voltage. The regulator circuit can reduce the ripple and reduce output variation, even when variations are present in one or both of supply characteristics and load characteristics.

The circuit 500 can further comprise an output 514, outputting the direct current energy from the rectifier 506. In some aspects, the output 514 can be connected to an electrical storage unit (e.g., the electrical storage unit 106), such as one or more batteries, one or more capacitors, and/or one or more supercapacitors.

Figure 6:
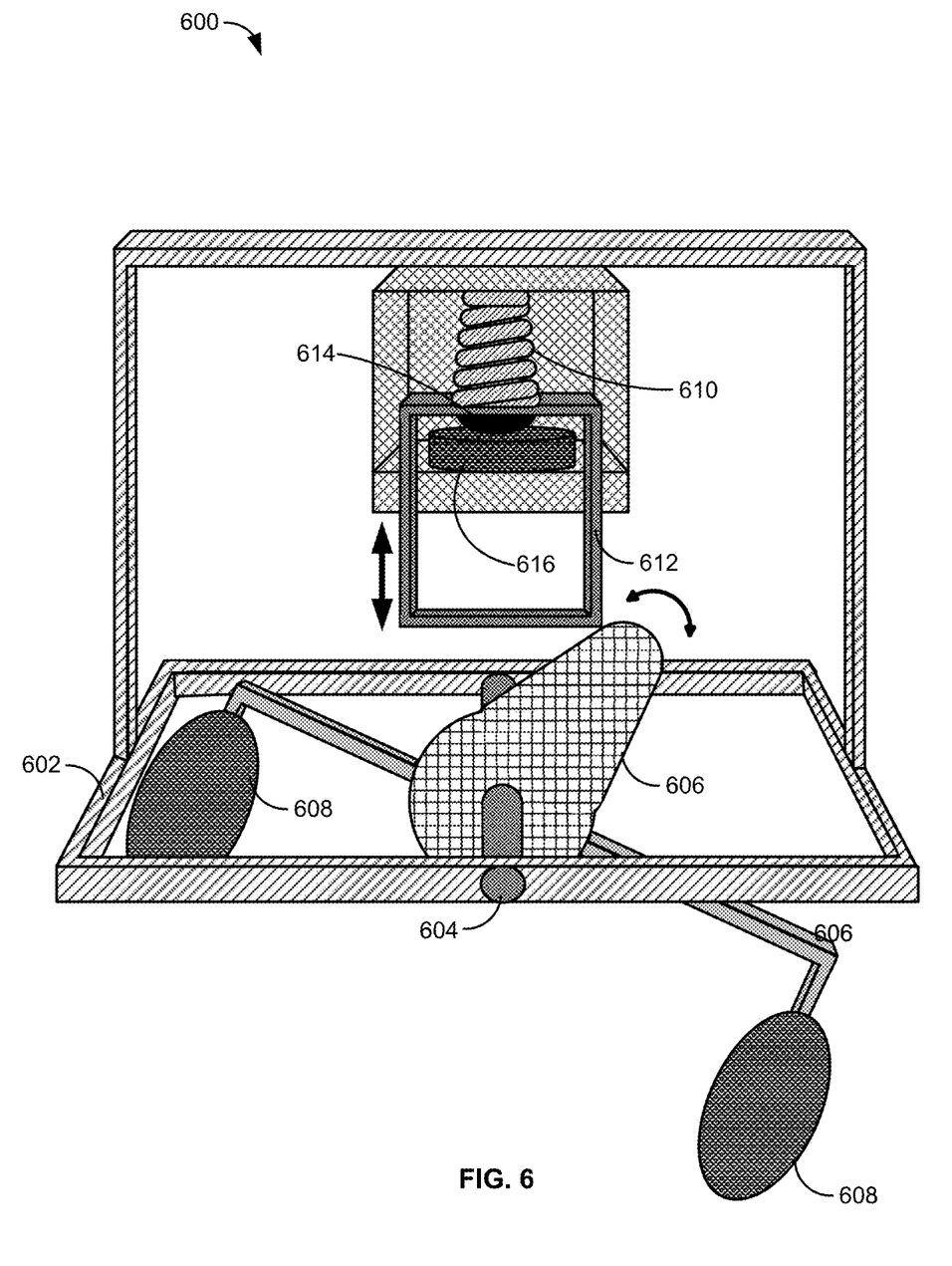
FIG. 6 illustrates a perspective view of an example electricity generation module.

FIG. 6 shows an embodiment of a piezoelectric power generation system 600. In some aspects, the system 600 can be used to convert energy from waves (e.g., waves produced by water in a lake, pond, or ocean) to electrical energy. The piezoelectric power generation system 600 can comprise a support 602 and an axle 604 connected to the support. The axle 604 can comprise a cam 606 mounted on the axle 604. In some aspects, the cam 606 can be rotatable about the axle 604. In other aspects, the cam 606 can be fixedly connected to the axle 604, and the axle 604 can be rotatable relative to the support 602.

A pair of buoys 608 can be attached to the cam 606. In some aspects, the buoys 608 can be separated from each other in a direction that is substantially transverse to the axle 604. In some aspects, the buoys 608 can be rigidly connected to one another, such that motion (e.g., waves) can cause the buoys to move relative to one another. The movement of the buoys 608 can result in rotation of the cam 606.

The system 600 can further comprise a mechanical energy storage device 610. In some aspects, the mechanical energy storage device 610 can comprise a helical spring, as shown in FIG. 6. In other aspects, the mechanical energy storage device 610 can comprise one or more of a flat spring or another elastic material. A first end of the mechanical energy storage device 610 can be affixed to the support 602. A second end of the mechanical energy storage device 610 can be in communication with (e.g., attached to) a cam follower 612, and can further comprise a mass 614.

The cam follower 612 can be in communication with the cam 606, such that the rotational motion of the cam 606 is translated into linear motion of the cam follower 612. The linear motion of the cam follower 612 can place the mechanical energy storage device 610 in a high potential energy state (e.g., by compressing the helical spring). The mechanical energy storage device 610 can then return to its low energy state (e.g., the helical spring can decompress). The returning to the low energy state can cause the mass 614 to strike a piezoelectric element 616 that is fixed relative to the support 602.

The piezoelectric element 616 can be formed from a piezoelectric material such as certain crystals (e.g., quartz, langasite, gallium orthophosphate, lithium niobate, lithium tantalite, lead titanate, topaz, and the like), ceramics (e.g., perovskite ceramics, barium titanate, lead zirconate titanate (PZT), sodium tungstate, sodium potassium niobate, bismuth ferrite, bismuth titanate, and the like), group III-V and II-VI semiconductors, and polymers such as polyvinyldiene fluoride (PVDF). The piezoelectric material can comprise any material that can be configured to generate an electrical signal when the piezoelectric material is put under a mechanical stress and/or strain. For example, a force generated by an impact from the mass 614 can cause the piezoelectric element 616 to generate an electrical charge having a voltage potential. In some materials, the generated voltage potential can be relatively large, on the order of thousands of volts. The generated voltage potential can be proportional to the suddenness and/or the strength of the mechanical stress and/or strain applied to the piezoelectric material. Therefore, mechanical energy (e.g., energy produced by waves) can be converted into electrical energy by using the mechanical energy to impart a mechanical stress and/or strain to the piezoelectric element 616. In some aspects, the piezoelectric element 616 can be formed as a disc, a cylinder, or other shapes beneficial to design and/or function.

Figure 7:
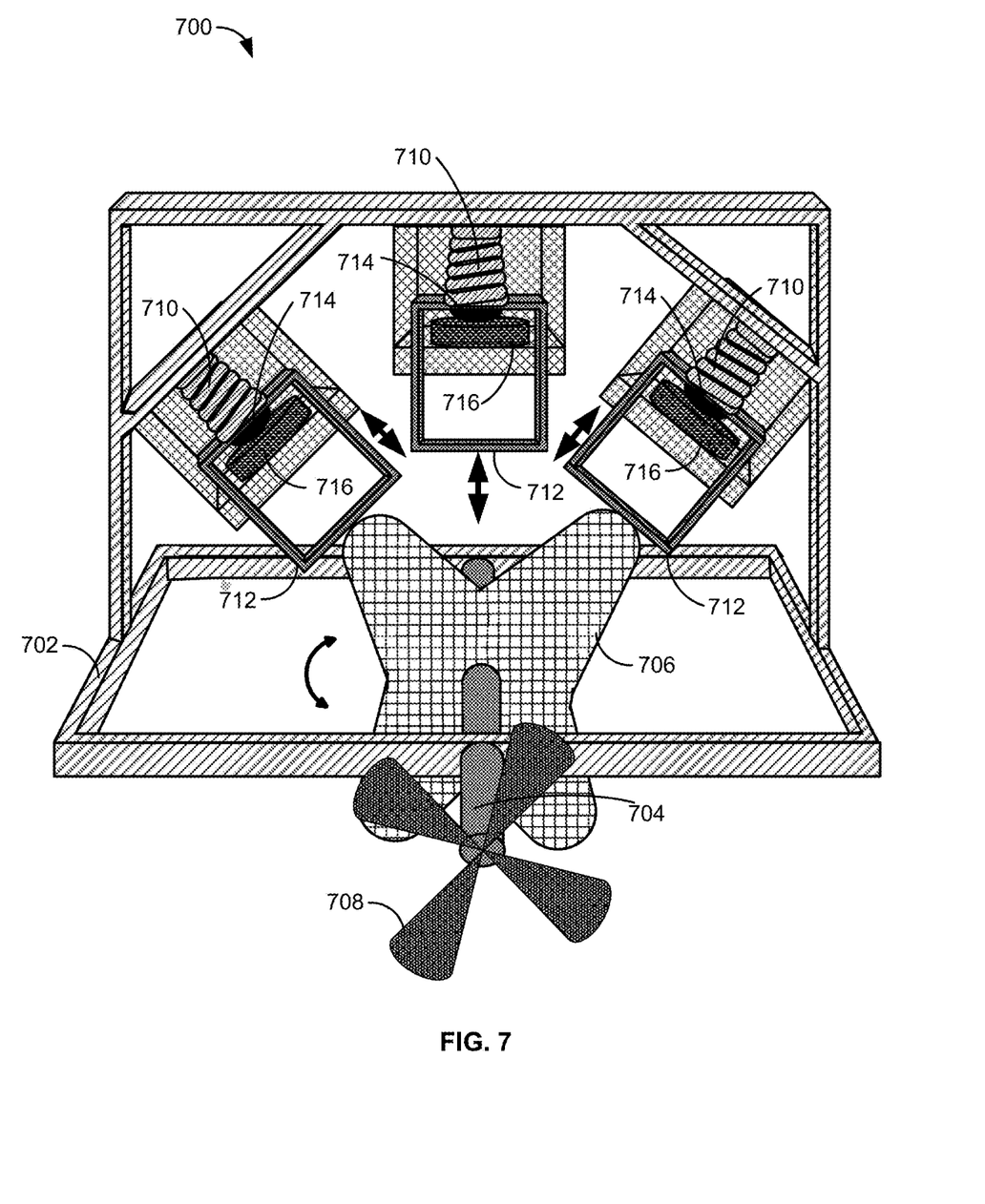
FIG. 7 illustrates a perspective view of another example electricity generation module.

FIG. 7 shows another embodiment of a piezoelectric power generation system 700. In some aspects, the system 700 can be used to convert energy from flow of a medium (e.g., flowing water or air) to electrical energy. The piezoelectric power generation system 700 can comprise a support 702 and an axle 704 connected to the support. The axle 704 can comprise a cam 706 mounted on the axle 704. In some aspects, the cam 706 can be fixedly connected to the axle 704, and the axle 704 can be rotatable relative to the support 702.

A turbine 708 can be attached to the axle 704. In some aspects, flow of the medium surrounding the turbine 708 can cause rotation of the turbine, 708, thereby effecting rotation of the axle 704.

The system 700 can further comprise one or more mechanical energy storage devices 710. For example, as shown in FIG. 7, the system 700 can comprise three mechanical energy storage devices 710. In some aspects, each of the mechanical energy storage devices 710 can comprise a helical spring, as shown in FIG. 7. In other aspects, each of the mechanical energy storage devices 710 can comprise one or more of a flat spring or another elastic material. A first end of each of the mechanical energy storage devices 710 can be affixed to the support 702. A second end of each of the mechanical energy storage devices 710 can be in communication with (e.g., attached to) a respective cam follower 712, and can further comprise a mass 714.

Each cam follower 712 can be in communication with the cam 706, such that the rotational motion of the cam 706 is translated into linear motion of the cam follower 712. The linear motion of the cam follower 712 can place the respective mechanical energy storage device 710 in a high potential energy state (e.g., by compressing the helical spring). The mechanical energy storage device 710 can then return to its low energy state (e.g., the helical spring can decompress). The returning to the low energy state can cause the mass 714 to strike a piezoelectric element 716 that is fixed relative to the support 702. In some aspects, the masses 714 of one or more mechanical energy storage devices 710 can each strike a single piezoelectric element 716. In other aspects, the masses 714 of each of the mechanical energy storage devices 710 can be associated with a separate piezoelectric element 716, as shown in FIG. 7.

The piezoelectric element 716 can be formed from a piezoelectric material such as certain crystals (e.g., quartz, langasite, gallium orthophosphate, lithium niobate, lithium tantalite, lead titanate, topaz, and the like), ceramics (e.g., perovskite ceramics, barium titanate, lead zirconate titanate (PZT), sodium tungstate, sodium potassium niobate, bismuth ferrite, bismuth titanate, and the like), group III-V and II-VI semiconductors, and polymers such as polyvinyldiene fluoride (PVDF). The piezoelectric material can comprise any material that can be configured to generate an electrical signal when the piezoelectric material is put under a mechanical stress and/or strain. For example, a force generated by an impact from the mass 714 can cause the piezoelectric element 716 to generate an electrical charge having a voltage potential. In some materials, the generated voltage potential can be relatively large, on the order of thousands of volts. The generated voltage potential can be proportional to the suddenness and/or the strength of the mechanical stress and/or strain applied to the piezoelectric material. Therefore, mechanical energy (e.g., energy produced by waves) can be converted into electrical energy by using the mechanical energy to impart a mechanical stress and/or strain to the piezoelectric element 716. In some aspects, the piezoelectric element 716 can be formed as a disc, a cylinder, or other shapes beneficial to design and/or function.

Figure 8:
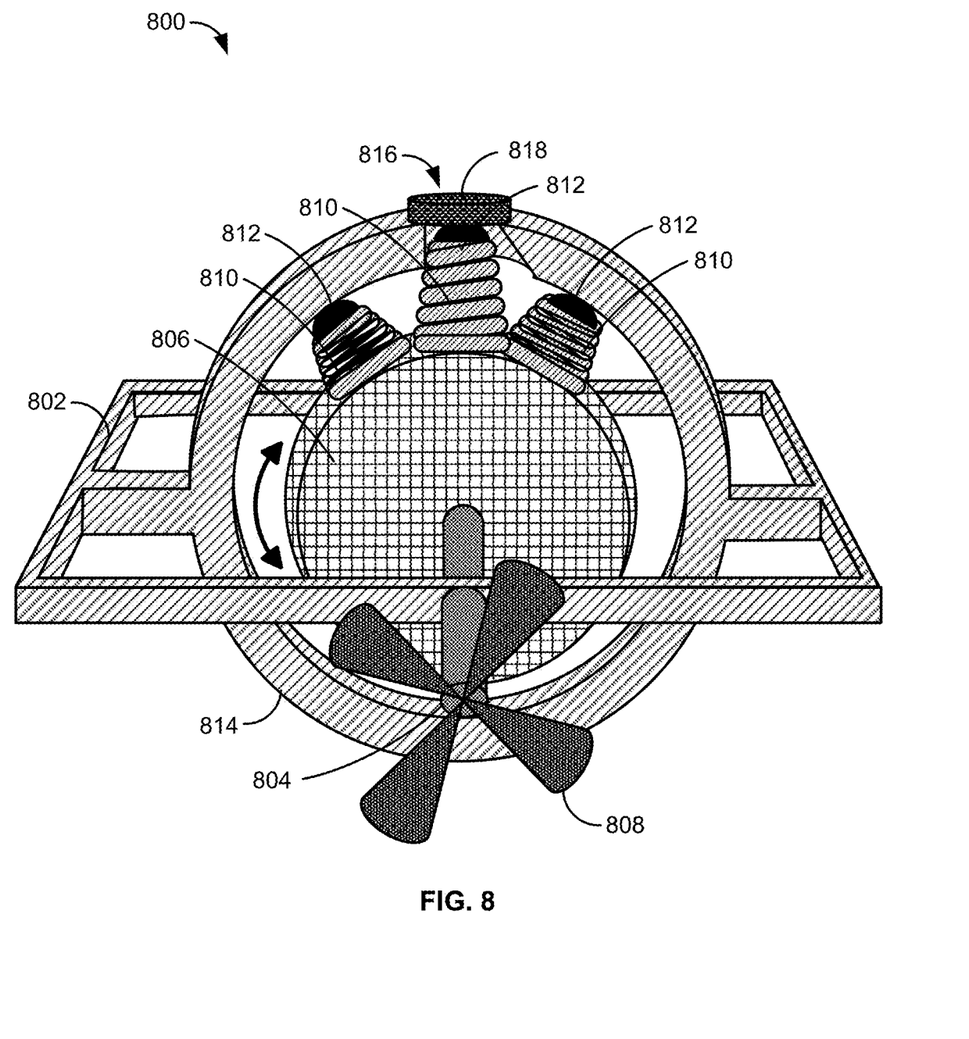
FIG. 8 illustrates a perspective view of another example electricity generation module.

FIG. 8 shows another embodiment of a piezoelectric power generation system 800. In some aspects, the system 800 can be used to convert energy from flow of a medium (e.g., flowing water or air) to electrical energy. The piezoelectric power generation system 800 can comprise a support 802 and an axle 804 connected to the support. The axle 804 can comprise a disc 806 mounted on the axle 804. In some aspects, the disc 806 can be fixedly connected to the axle 804, and the axle 804 can be rotatable relative to the support 802.

A turbine 808 can be attached to the axle 804. In some aspects, flow of the medium surrounding the turbine 808 can cause rotation of the turbine, 808, thereby effecting rotation of the axle 804 and the disc 806.

The system 800 can further comprise one or more mechanical energy storage devices 810. For example, as shown in FIG. 8, the system 800 can comprise three mechanical energy storage devices 810. In some aspects, each of the mechanical energy storage devices 810 can comprise a helical spring, as shown in FIG. 8. In other aspects, each of the mechanical energy storage devices 810 can comprise one or more of a flat spring or another elastic material. A first end of each of the mechanical energy storage devices 810 can be affixed to the disc 806. A second end of each of the mechanical energy storage devices 810 can comprise a mass 812.

A substantially annular guide 814 can be disposed to at least partially surround the disc 806. The guide 814 can be sized such that an outer diameter of the guide 814 corresponds to a low energy state of the one or more mechanical energy storage devices 810 and the inner diameter corresponds to a high energy state of the one or more mechanical energy storage devices 810. The annular guide 814 can comprise a cutout 816, such that a leading edge of the cutout 816 in the direction of rotation of the disc is orthogonal to the axle 804, and a trailing edge of the cutout 816 is at an angle relative to the axle 804.

The annular guide 814 can serve as a guide, such that the rotational motion of the disc 806 causes the mechanical energy storage device 810 to follow an inner radius of the guide 816 in a high potential energy state (e.g., by compressing the helical spring). As the mechanical energy storage device 810 reaches the cutout 816, the mechanical energy storage device 810 can then transition to a low energy state (e.g., the helical spring can decompress). The returning to the low energy state can cause the mass 812 to strike a piezoelectric element 818 that is fixed to the guide 814. The trailing edge of the cutout 816 the causes the mechanical energy storage element to return to the high energy state.

The piezoelectric element 818 can be formed from a piezoelectric material such as certain crystals (e.g., quartz, langasite, gallium orthophosphate, lithium niobate, lithium tantalite, lead titanate, topaz, and the like), ceramics (e.g., perovskite ceramics, barium titanate, lead zirconate titanate (PZT), sodium tungstate, sodium potassium niobate, bismuth ferrite, bismuth titanate, and the like), group III-V and II-VI semiconductors, and polymers such as polyvinyldiene fluoride (PVDF). The piezoelectric material can comprise any material that can be configured to generate an electrical signal when the piezoelectric material is put under a mechanical stress and/or strain. For example, a force generated by an impact from the mass 812 can cause the piezoelectric element 818 to generate an electrical charge having a voltage potential. In some materials, the generated voltage potential can be relatively large, on the order of thousands of volts. The generated voltage potential can be proportional to the suddenness and/or the strength of the mechanical stress and/or strain applied to the piezoelectric material. Therefore, mechanical energy (e.g., energy produced by waves) can be converted into electrical energy by using the mechanical energy to impart a mechanical stress and/or strain to the piezoelectric element 818. In some aspects, the piezoelectric element 818 can be formed as a disc, a cylinder, or other shapes beneficial to design and/or function.

Figure 9A:
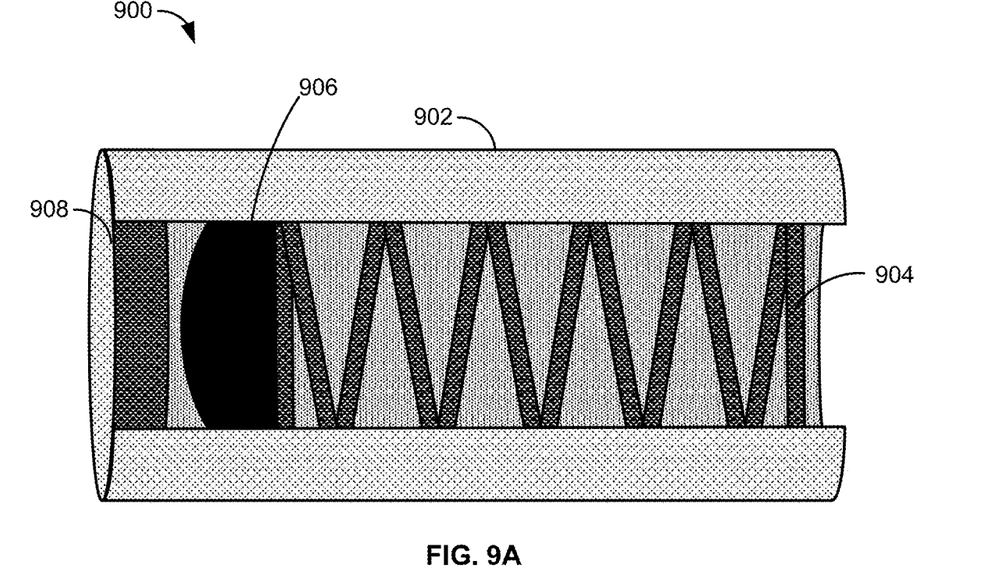
FIGS. 9A and 9B illustrate a perspective view of an example of an electricity generation module comprising a flexible housing
Figure 9B:
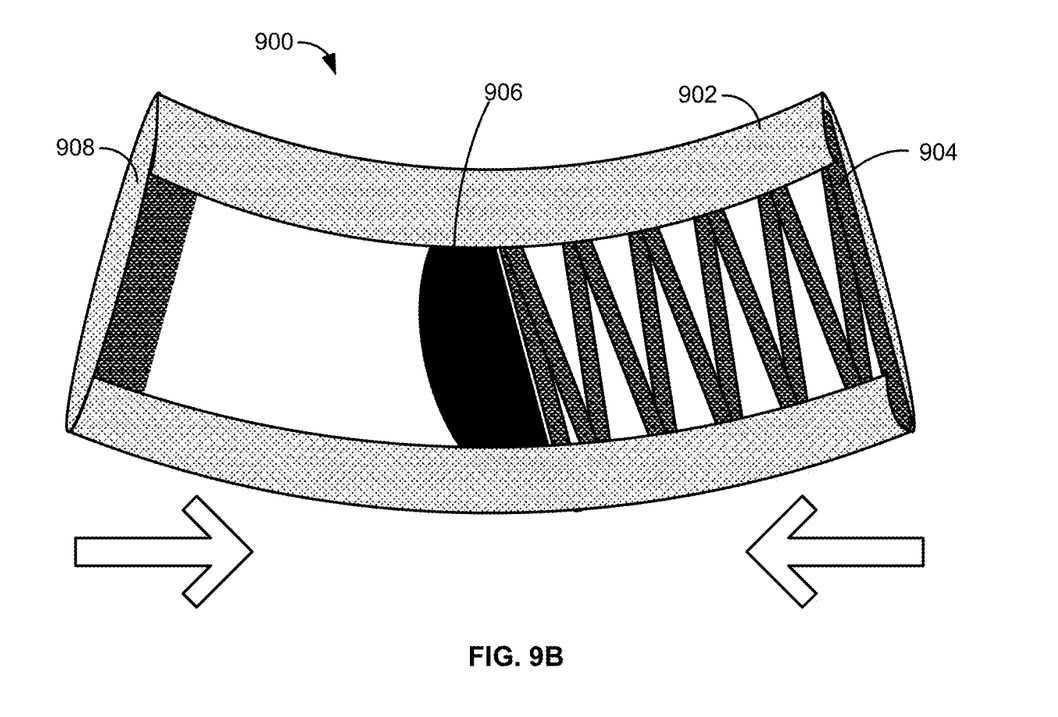

FIGS. 9A and 9B show an embodiment of a piezoelectric power generation system 900 with a flexible housing. In some aspects, the system 900 can be used to convert energy from waves (e.g., waves produced by water in a lake, pond, or ocean) to electrical energy. The piezoelectric power generation system 900 can comprise a flexible housing 902. In some aspects, the flexible housing 902 can be formed from a foam, rubber, or plastic material to aid in flotation of the system 900.

The system 900 can further comprise a mechanical energy storage device 904. In some aspects, the mechanical energy storage device 904 can comprise a helical spring, as shown in FIG. 9. In other aspects, the mechanical energy storage device 904 can comprise one or more of a flat spring or another elastic material. A first end of the mechanical energy storage device 904 can be affixed to a first end of the housing 902. A second end of the mechanical energy storage device 904 can comprise a mass 906.

Passing waves can deform the housing 902 as shown in FIG. 9B, causing the mechanical energy storage device 904 to deform and/or compress, which in turn causes the mass 906 to strike a piezoelectric element 908.

The piezoelectric element 908 can be formed from a piezoelectric material such as certain crystals (e.g., quartz, langasite, gallium orthophosphate, lithium niobate, lithium tantalite, lead titanate, topaz, and the like), ceramics (e.g., perovskite ceramics, barium titanate, lead zirconate titanate (PZT), sodium tungstate, sodium potassium niobate, bismuth ferrite, bismuth titanate, and the like), group III-V and II-VI semiconductors, and polymers such as polyvinyldiene fluoride (PVDF). The piezoelectric material can comprise any material that can be configured to generate an electrical signal when the piezoelectric material is put under a mechanical stress and/or strain. For example, a force generated by an impact from the mass 906 can cause the piezoelectric element 908 to generate an electrical charge having a voltage potential. In some materials, the generated voltage potential can be relatively large, on the order of thousands of volts. The generated voltage potential can be proportional to the suddenness and/or the strength of the mechanical stress and/or strain applied to the piezoelectric material. Therefore, mechanical energy (e.g., energy produced by waves) can be converted into electrical energy by using the mechanical energy to impart a mechanical stress and/or strain to the piezoelectric element 908. In some aspects, the piezoelectric element 908 can be formed as a disc, a cylinder, or other shapes beneficial to design and/or function.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. An electricity generation module comprising:
   a flexible housing; and
   a first piezoelectric generator unit comprising,
      a piezoelectric element,
      a mechanical energy storage unit configured to receive mechanical energy from the flexible housing and store the mechanical energy as stored mechanical energy, wherein the flexible housing generates the mechanical energy due to deformation of the flexible housing by a force applied to the flexible housing, and
      a mass configured to,
         receive the stored mechanical energy from the mechanical energy storage unit when the stored mechanical energy is released,
         move with a velocity as a result of receiving the stored mechanical energy, and
         deform the piezoelectric element based on the velocity of the mass.

2. The electricity generation module of claim 1, further comprising a coupling mechanism connected to the flexible housing, wherein the coupling mechanism can couple the electricity generation module to a second electricity generation module.

3. The electricity generation module of claim 2, wherein the coupling mechanism comprises an electrical connector for the electricity generation module to be in electrical communication with the second electricity generation module.

4. The electricity generation module of claim 1, wherein the flexible housing is configured to float and to receive the force from fluid motion.

5. The electricity generation module of claim 1, wherein the flexible housing comprises a second piezoelectric generator unit in electrical communication with the first piezoelectric generator unit.

6. The electricity generation module of claim 1, further comprising an electronic circuit in electrical communication with the piezoelectric element, wherein the electronic circuit comprises a rectifier in electrical communication with the piezoelectric element and an output unit in electrical communication with the rectifier.

7. The electricity generation module of claim 6, wherein the electronic circuit further comprises:
   a transformer in electrical communication between the piezoelectric element and the rectifier; and
   a stabilizer between the output unit and the rectifier.

8. The electricity generation module of claim 6, wherein the output unit comprises an electrical storage unit.

9. A system comprising:
   a first piezoelectric generator unit comprising,
      a piezoelectric element,
      a mechanical energy storage unit configured to receive mechanical energy from a flexible housing and store the mechanical energy as stored mechanical energy, wherein the flexible housing generates the mechanical energy due to deformation of the flexible housing by a force applied to the flexible housing, and
      a mass configured to,
         receive the stored mechanical energy from the mechanical energy storage unit when the stored mechanical energy is released,
         move with a velocity as a result of receiving the stored mechanical energy, and
         deform the piezoelectric element based on the velocity of the mass; and a computing device configured communicatively coupled to the first piezoelectric generator unit configured to:
determine, based on the deformation of the piezoelectric element, a current.

10. The system of claim 9, further comprising a coupling mechanism connected to the flexible housing, wherein the coupling mechanism can couple the electricity generation module to a second electricity generation module.

11. The system of claim 10, wherein the coupling mechanism comprises an electrical connector for the electricity generation module to be in electrical communication with the second electricity generation module.

12. The system of claim 9, wherein the flexible housing is configured to float and to receive the force from fluid motion.

13. The system of claim 9, wherein the flexible housing comprises a second piezoelectric generator unit in electrical communication with the first piezoelectric generator unit.

14. The system of claim 9, further comprising an electronic circuit in electrical communication with the piezoelectric element, wherein the electronic circuit comprises a rectifier in electrical communication with the piezoelectric element and an output unit in electrical communication with the rectifier.

15. A method comprising:
receiving, by a mechanical energy storage unit, and from a flexible housing, mechanical energy, wherein the flexible housing is configured to generate the mechanical energy due to deformation of the flexible housing by a force applied to the flexible housing;
storing the mechanical energy as stored mechanical energy;
deforming, based on a velocity of a mass, a piezoelectric element, wherein the mass is configured to:
receive the stored mechanical energy from the mechanical energy storage unit when the stored mechanical energy is released, and
move with a velocity as a result of receiving the stored mechanical energy; and
determining, based on the deformed piezoelectric element, a voltage.

16. The method of claim 15, wherein the mechanical energy storage unit is configured to store mechanical energy as potential energy.

17. The method of claim 15, wherein the flexible housing is configured to float and to receive the force from fluid motion.

18. The method of claim 15, wherein the piezoelectric element comprises a piezoelectric crystal.

19. The method of claim 15, further comprising outputting the voltage.

20. The method of claim 15, further comprising determining a degree of deformation of the piezoelectric element.

21. The method of claim 20, wherein the voltage is associated with the degree of deformation of the piezoelectric element.

* * * * *